United States Patent [19]

Ogyu

[11] Patent Number: 5,732,690
[45] Date of Patent: Mar. 31, 1998

[54] APPARATUS FOR CUTTING A STONE MEMBER SO AS TO HAVE A CURVED SURFACE

[76] Inventor: Shingo Ogyu, 2-6-13, Yahei, Kawaguchi, Saitama 332, Japan

[21] Appl. No.: 703,953

[22] Filed: Aug. 28, 1996

[30] Foreign Application Priority Data

Aug. 31, 1995 [JP] Japan ................................. 7-245215

[51] Int. Cl.$^6$ ....................................................... B28D 5/00
[52] U.S. Cl. ........................ 125/30.01; 125/21; 125/11.06; 125/13.01
[58] Field of Search ........................... 125/21, 30.01, 125/11.06, 13.01, 13.02, 13.03

[56] References Cited

U.S. PATENT DOCUMENTS

| 2,795,222 | 6/1957 | Garrison | 125/21 |
| 4,016,856 | 4/1977 | McLaughlin | 125/21 |
| 5,303,689 | 4/1994 | Mayer | 125/21 |
| 5,605,141 | 2/1997 | Bilotta | 125/21 |

Primary Examiner—Robert A. Rose
Assistant Examiner—George Nguyen
Attorney, Agent, or Firm—Oblon, Spivak, McClelland, Maier & Neustadt, P.C.

[57] ABSTRACT

An apparatus for cutting a stone member (90) so as to have a curved surface including a cutting device (10) having a base member (12) which is movable in horizontal direction by an electric motor (23) and an endless wire saw (17) disposed on the base member and driven by an electric motor (19) so as to make the vertical movement of the cutting portion thereof, a table (27) which has a narrow space for passing the wire saw by the movement of the base member and many rollers (30) each of which is rotatably supported on the prescribed position of the table for supporting the stone member and is rotatable around an axis elongated in the moving direction of the base member, a frame (32) which is movable by an electric motor for moving the stone member supported on the rollers, and a control device (40) which controls the electric motor for moving the base member and the electric motor for moving the frame. The control device may be an optical follow device.

3 Claims, 3 Drawing Sheets

APPARATUS FOR CUTTING A STONE MEMBER SO AS TO HAVE A CURVED SURFACE

FIELD OF THE INVENTION

This invention relates to an apparatus for cutting a stone member so as to have a curved surface by an endless wire saw having many cutting parts made of materials including diamond powder, which is suitable for cutting a plate stone member.

BACKGROUND OF THE INVENTION

In the prior art for cutting a plate stone member so as to have a curved peripheral surface, a hand work method using an electric cutting device is known. An automatical cutting device is also known, but it is necessary to move the plate stone member by hands so as to make a curvilinear movement. Therefore, the device can not be used.

The inventor of this invention has provided an apparatus for cutting a stone member so as to have a curved surface in Japanese Non-examined Patent Publication No. 8-118342. The same application was also filed in the U.S. Patent and Trademark Office, Ser. No. thereof is 08/668,231. But, the apparatus is not suitable for cutting a plate stone member.

SUMMARY OF THE INVENTION

Accordingly, it is an object of the present invention to provide an apparatus for cutting a stone member so as to have a curved surface by an endless wire saw with a control device, which is suitable for cutting a plate stone member so as to have a curved peripheral surface.

Another object of the present invention is to provide an apparatus for cutting a stone member so as to have a curved surface using an optical follow device as a control device. In such case a computor and pulse motors are not necessary and the apparatus has a mechanically simple inexpensive structure.

This invention also provides an apparatus for cutting a stone member so as to have a curved surface, which has a cutting device having a base member which is movable in horizontal direction by an electric motor and an endless wire saw disposed on sheeves on the base member and driven by a motor so as to make the vertical movement of the cutting portion, a table which has a narrow space for passing the wire saw by the movement of the base member and many rollers each of which is supported on the prescribed position of the table for supporting the stone member and is rotatable around an axis elongated in the moving direction of base member, a frame which is movable by an electric motor for moving the stone member supported on the rollers, and a control device which controls the electric motor for moving the base member and the electric motor for moving the frame. The control device may be an optical follow device.

BRIEF DESCRIPTION OF THE DRAWINGS

Various other objects, features, and attendant advantages of the present invention will be more fully appreciated as the same becomes better understood from the following detailed description when considered in connection with the accompanying drawings and wherein.

DESCRIPTION OF THE PREFERRED EMBODIMENT

Figure 1:
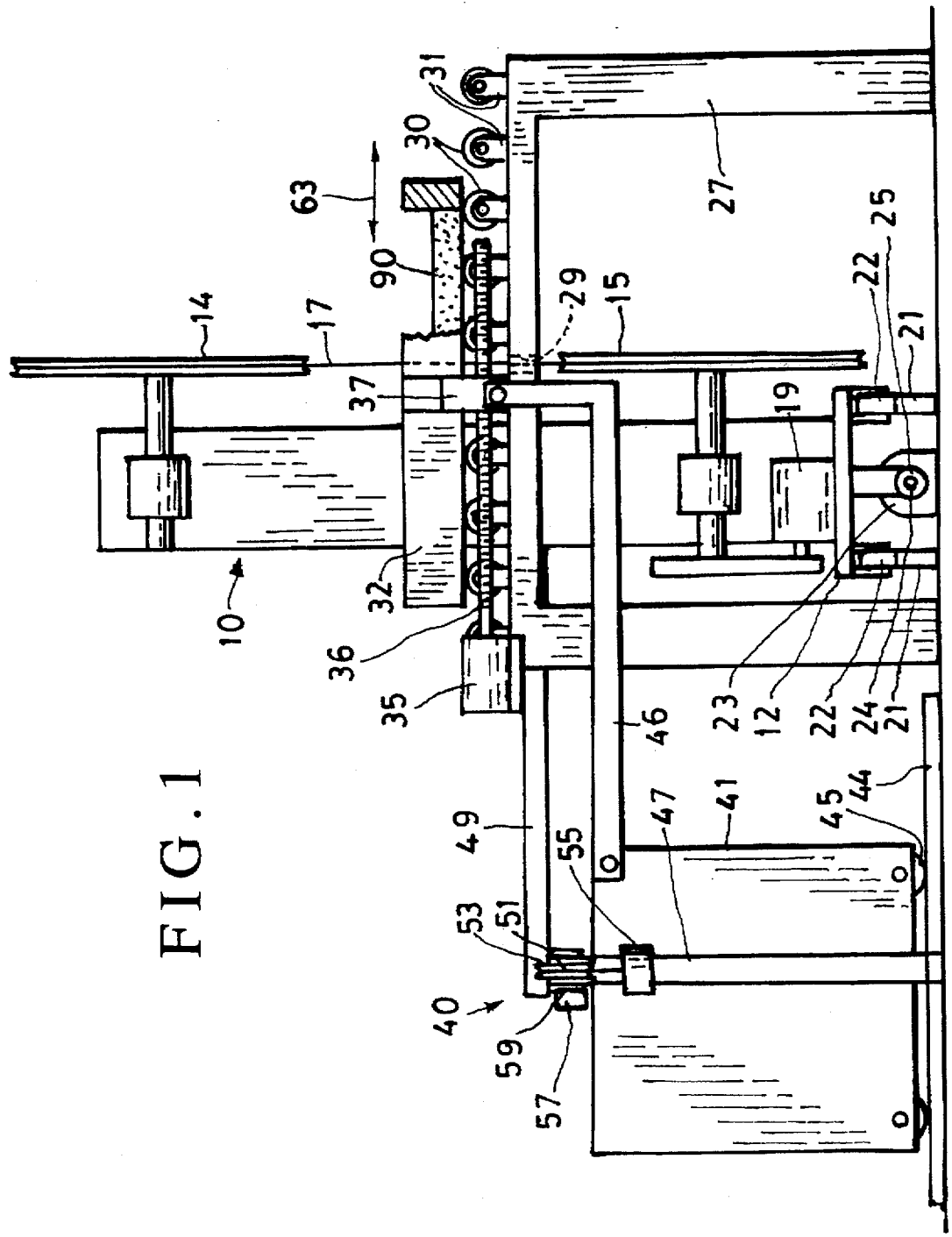
FIG. 1 is a front view of an embodiment of the present invention partly cut away.

Referring now to FIGS. 1 to 4, there is shown an embodiment of this invention. A cutting device 10 has a base member 12 which has an upper elongated portion. A pair of sheeves 14 and 15 are rotatably installed on the base member 12 at upper portion and lower portion thereof, respectively. A wire saw 17 is installed on the sheeves 14 and 15, which is made of an endless wire and has not shown many cutting parts made of materials including diamond powder. A motor 19 drives the sheeve 15 so as to make the vertically downward movement in the front cutting portion of the wire saw 17. The base member 12 is disposed on a pair of rails 21 by wheels 22. An electric motor 23 drives a screw 24. The base member 12 has a female screw 25 which engages with the screw 24. Therefore, the base member 12 is able to be horizontally moved in the direction shown by an arrow head 61.

A table 27 is horizontally disposed in the front portion and has a narrow space 29 made from rear end thereof to a portion near the front end thereof for passing the wire saw 17. Many rollers 30 are disposed on the table 27 at prescribed positions for supporting a plate stone member 90 and supported by bearings 31 at both ends thereof and able to be rotated around an axis disposed in the moving direction of the base member 12. A frame 32 is disposed on the table 27 and contacts to the peripheral surface of the plate stone member 90 at front and both sides thereof. The rear portion of the frame 32 is opened for passing the wire saw 17. 35 designates an electric motor which rotates a screw member 36 which engages with a female screw 37 fixed to the frame 32. Therefore, the plate stone member 90 is able to be moved by the electric motor 35 in the direction shown by an arrow head 63.

40 designates an optical follow device as a control device for controlling the electric motors 23 and 35, which is sold from Omron Co. Ltd.

The optical follow device 40 has a movable table 41 for disposing a model member 43 made of sheet such as paper or the like having a suitable outer configuration. The surface of the movable table 41 may be a transparent material, in such case the model member 43 may be set along inside surface of the movable table 41. The movable table 41 is able to run on a pair of rails 44 by wheels 45. A connecting member 46 connects the frame 32 and the movable table 41 so as to move the same length each other. A guide member 47 disposed at prescribed positon over the movable table 41. The base member 12 has a side elongated member 49 for connecting one end of a wire 51 which is elongated to front position along the guide member 47 by sheeves 52, 53. A weight 55 is attached to the front end of the wire 51 for tightening thereof. An optical censor 57 is attached to a movable member 59 which is connected to the wire 51 and able to be moved along the guide member 47 the same length with the moving length of the base member 12.

Figure 2:
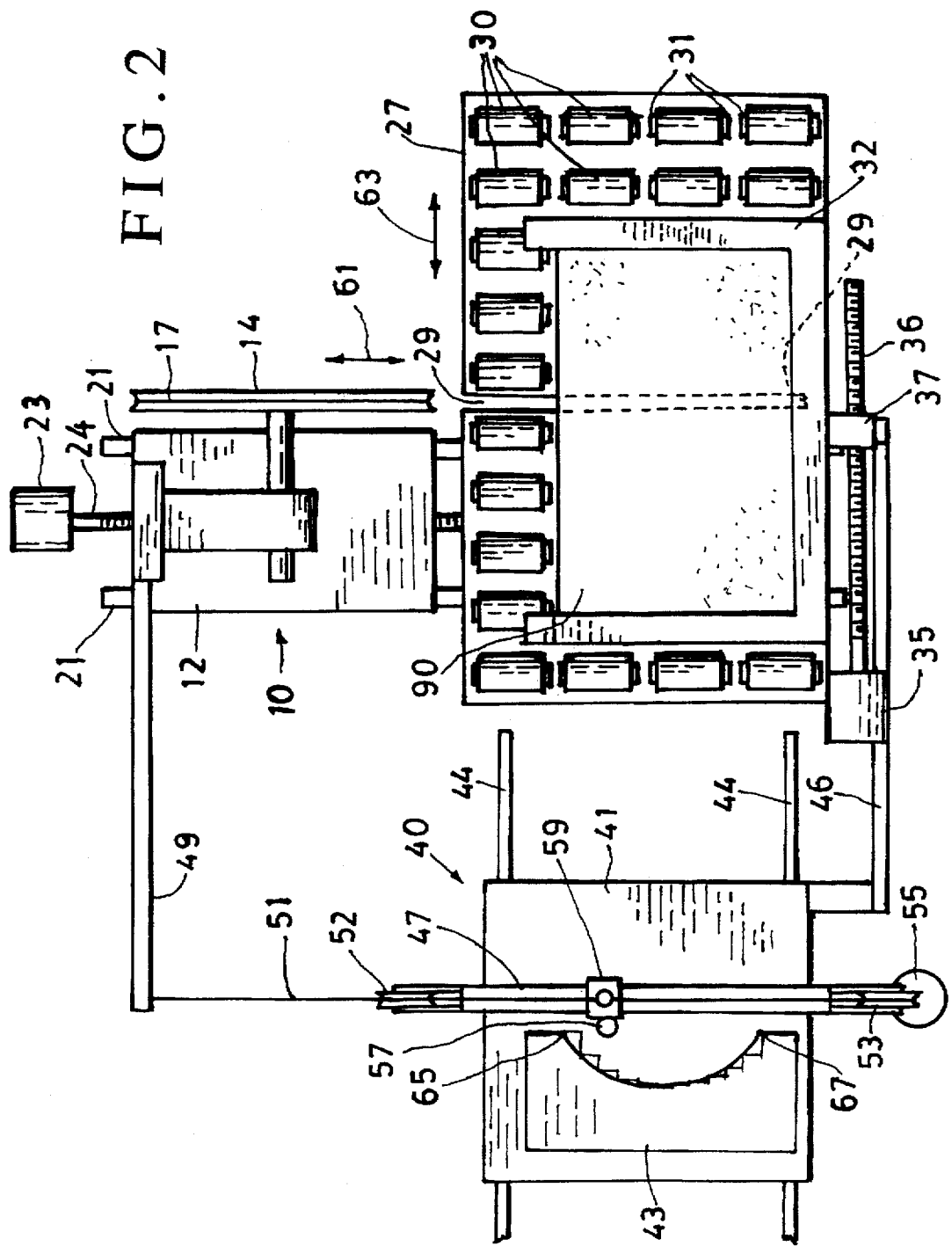
FIG. 2 is a plane view of the embodiment.
Figure 3:
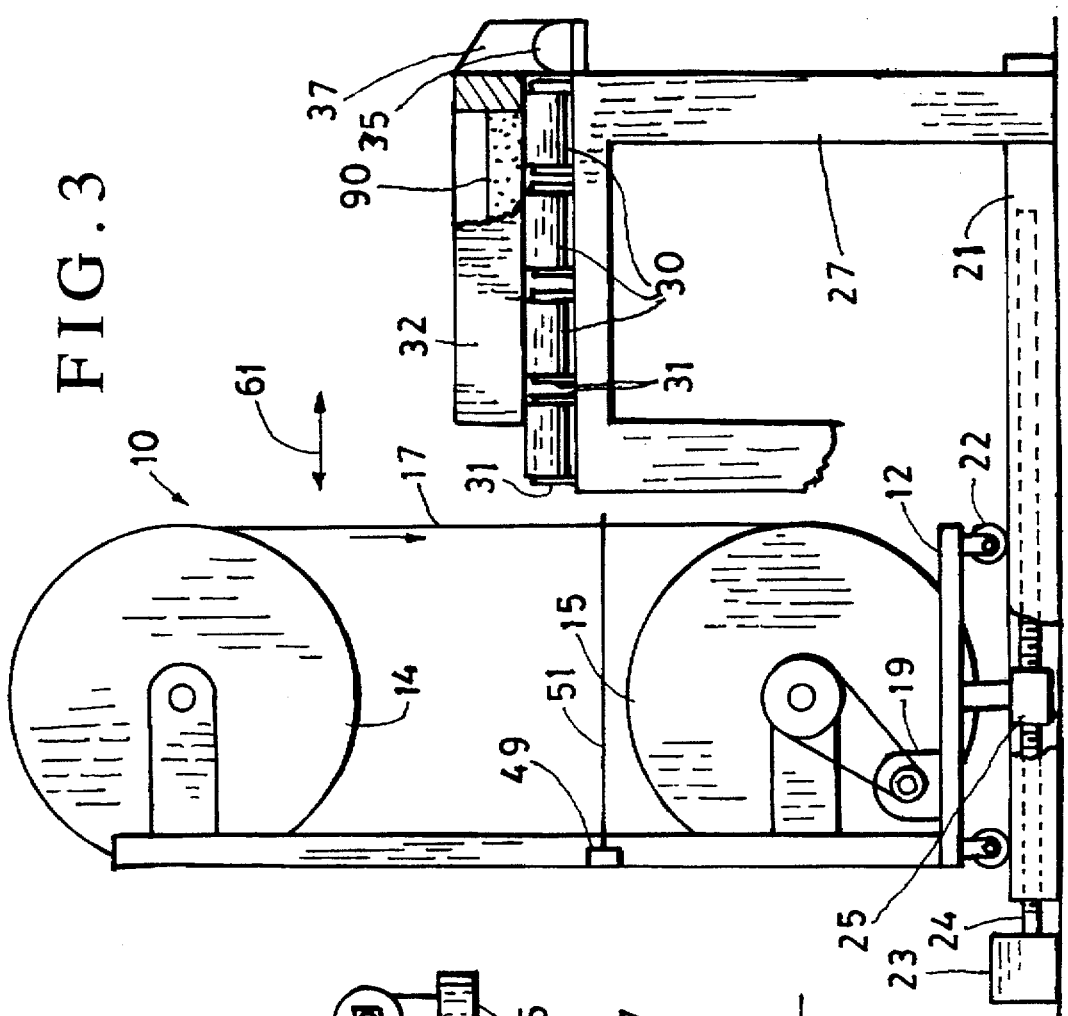
FIG. 3 is a side view of the embodiment partly removed and partly cut away.
Figure 4:
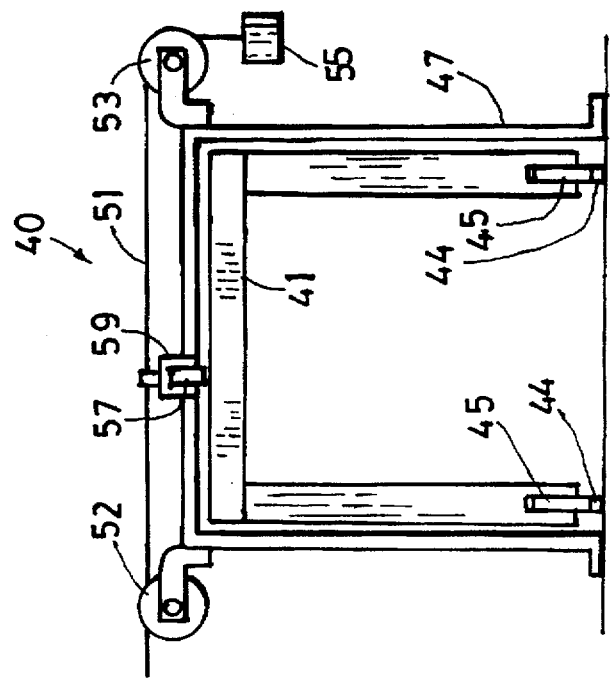
FIG. 4 is a side view of an optical follow device.

Referring now to FIG. 2, the activity of the optical follow device 40 will be described as follows. After setting a plate stone member 90 on the rollers 30, the base member 12 is to be set at a convenient position for cutting the plate stone member 90 by driving the electric motor 23. The optical censor 57 is to be set on a point 65 of the model member 43 by moving the movable table 41 with the frame 32 and the movable member 59 which is to be fixedly connected to the wire 51. The wire saw 17 is to be driven by the motor 19.

The base member 12 is to be moved by the electric motor 23 for example 0.2 mm in short time in the frontward direction as one step. The plate stone member 90 is cut the same length with the movement of the base member 12. And the optical censor 57 moves the same length. After the movement, the optical censor 57 emits a signal so as to make a sideward movement wherein the contour of the model member 43 comes to the position of the optical censor 57. The electric motor 35 drives the frame 32 and the movable table 41. The plate stone member 90 is sideward cut. When the optical censor 57 detects the contour of the model member 43, the wire saw 17 and the optical censor 57 are again driven to move frontward.

Thus, the optical censor 57 repeats to emit the signals. When the optical censor 57 has been reached to a point 67, the cutting is finished. All of the motors are stopped. The small lines in FIG. 2 shows such phenomenon in a enlarged scale. Therefore, it is easily understood that the optical censor 47 is able to follow along the contour of the model member 43. Then, the wire saw 17, the base member 12 and the optical censor 57 are returned to the initial position.

In the above explanation, the size of the cutting shape of the plane stone member 90 is corresponding to the size of the model member 43, however, it is available to use a model member which has ½ size of the cutting portion of the plane stone member 90 in all direction by making the moving velocity of the wire 51 is ½ of the moving velocity of the base member 12 and the moving velocity of the movable table 41 is ½ of the moving velocity of the frame 32 using suitable velocity reduction devices. The model member 43 may be used various ratio against to the cutting portion of the stone member.

In this invention, it is not always necessary to correspond the ratio of the moving distance of the base member 12 and the moving distance of the optical censor 57 with the ratio of the moving length of the frame 32 and the moving length of the movable table 41.

The electric motors 23 and 35 may be controlled various control devices. In case of a computer as a control device, it is necessary to use pulse motors as the electric motors 23 and 35.

The apparatus is able to be used for cutting a thick stone member so as to have a curved surface.

The apparatus is also used for cutting a large hole in a plate of stone member. The wire saw 17 has a connecting portion for separation. After separation of the connecting portion, one end of the wire saw 17 is to be inserted into a small hole made on the plate of stone member and connected with the other end, then the large hole is able to be cut.

The foregoing is of course considered as illustrative only of the present invention. Obviously, numerous modifications of the present invention are possible in light of the above teaching.

I claim:

1. An apparatus for cutting a stone member so as to have a curved surface, which comprising a cutting device having a base member which is movable in horizontal direction by an electric motor and an endless wire saw disposed on sheeves supported by said base member and driven by a motor so as to make vertical movement of the cutting portion, a table which has a narrow space for passing said wire saw owing to the movement of said base member and has many rollers each of which is supported on the prescribed position of said table for supporting the stone member and is rotatable around an axis elongated in the moving direction of said base member, a frame which is movable by an electric motor for moving the stone member supported on said rollers in perpendicular direction against to the moving direction of said base member, and a control device which controls said electric motor for moving said base member and said electric motor for moving said frame.

2. An apparatus as set forth in claim 1, wherein said frame has a front portion and a pair of side portions.

3. An apparatus as set forth in claim 1, wherein said control device is an optical follow device.

\* \* \* \* \*